(12) United States Patent
Honda et al.

(10) Patent No.: US 7,887,705 B2
(45) Date of Patent: Feb. 15, 2011

(54) SYSTEM FOR TREATING RESIDUAL WATER

(75) Inventors: Takeshi Honda, Camacari (BR); Julia Takako Honda, São Paulo (BR)

(73) Assignee: Sansuy S/A Industria De Plasticos (BR)

( * ) Notice: Subject to any disclaimer, the term of this patent is extended or adjusted under 35 U.S.C. 154(b) by 102 days.

(21) Appl. No.: 12/066,729

(22) PCT Filed: Nov. 8, 2005

(86) PCT No.: PCT/BR2005/000229
§ 371 (c)(1),
(2), (4) Date: Dec. 30, 2008

(87) PCT Pub. No.: WO2007/036008
PCT Pub. Date: Apr. 5, 2007

(65) Prior Publication Data
US 2009/0188850 A1    Jul. 30, 2009

(30) Foreign Application Priority Data
Sep. 27, 2005    (BR) .................... 8502055 U

(51) Int. Cl.
*C02F 3/28* (2006.01)
*C02F 11/04* (2006.01)
(52) U.S. Cl. ................ 210/603; 210/170.08
(58) Field of Classification Search .......... 210/603, 210/170.01, 170.08; 71/10
See application file for complete search history.

(56) References Cited

U.S. PATENT DOCUMENTS

| 2,605,220 | A | | 7/1952 | Logan |
| 4,100,023 | A | * | 7/1978 | McDonald ............ 435/167 |
| 4,323,367 | A | * | 4/1982 | Ghosh ............ 48/197 A |
| 4,668,388 | A | * | 5/1987 | Dibble et al. ............ 210/150 |
| 5,587,080 | A | * | 12/1996 | Landine et al. ............ 210/603 |
| 2002/0070152 | A1 | * | 6/2002 | Charbonneau ............ 210/170 |
| 2002/0121477 | A1 | * | 9/2002 | Oswald et al. ............ 210/603 |
| 2004/0191755 | A1 | * | 9/2004 | Kemper et al. ............ 435/3 |
| 2009/0139633 | A1 | * | 6/2009 | Buchi et al. ............ 156/91 |

FOREIGN PATENT DOCUMENTS
DE    3604415 A1    8/1987

OTHER PUBLICATIONS
International Search Report for PCT/BR2005/000229 dated Jul. 14, 2006.
* cited by examiner

*Primary Examiner*—Fred Prince
(74) *Attorney, Agent, or Firm*—McCormick, Paulding & Huber LLP

(57) ABSTRACT

Improvements on a system for treating residual water, presents a new solution for the conformation of a system for treating residual water and for such purpose, it basically consists of a lower blanket (1), preferably produced in PVC, and of a cover blanket (2), which is also preferably produced in PVC, in any color, which may be double-faced, including, in the present model still features a reactor (3), a deep chamber (4) and an anaerobic pond (5), and such elements may be excavated in the soil (S) or made of stonemasonry or any kind of suitable material for this purpose.

7 Claims, 6 Drawing Sheets

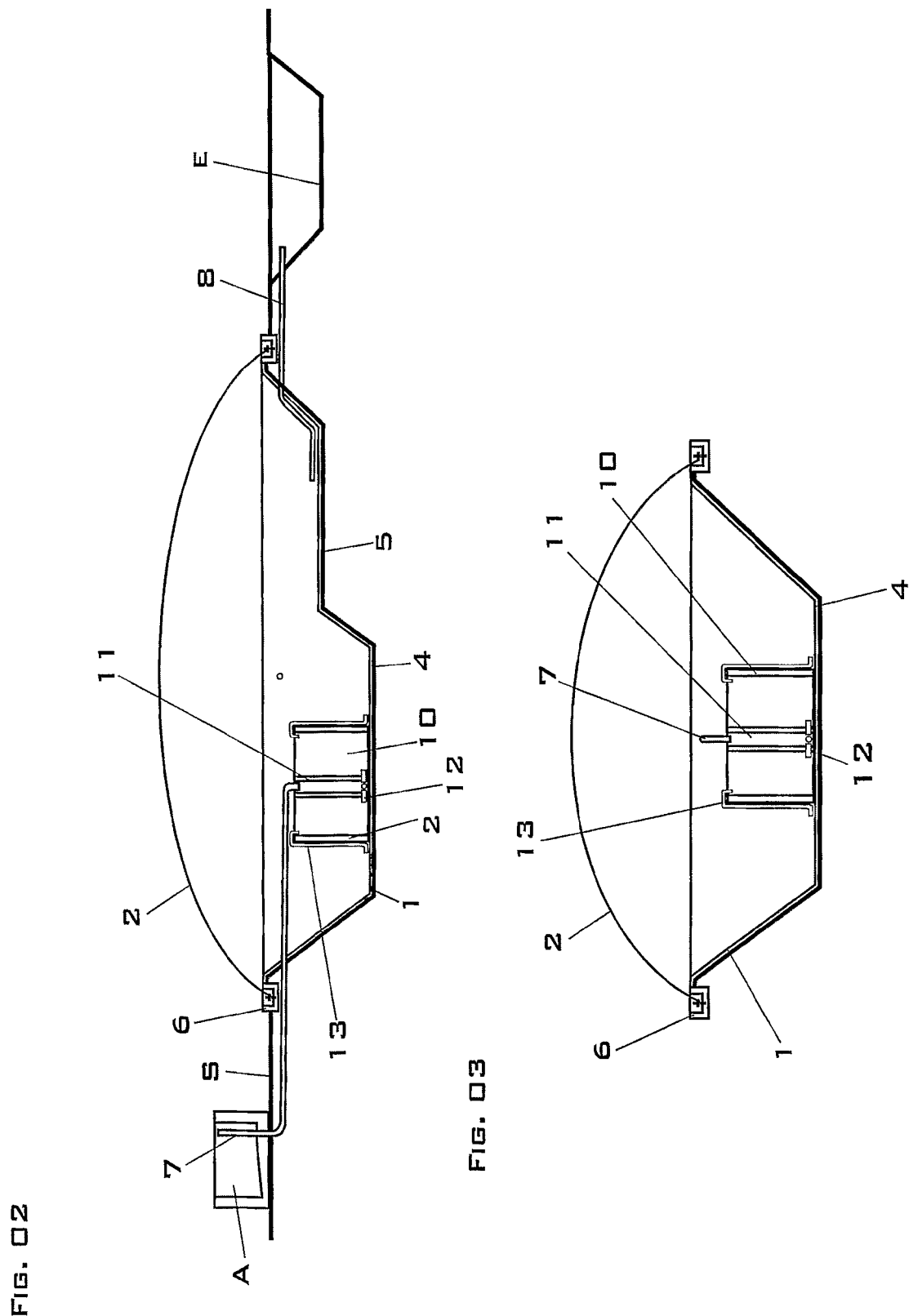

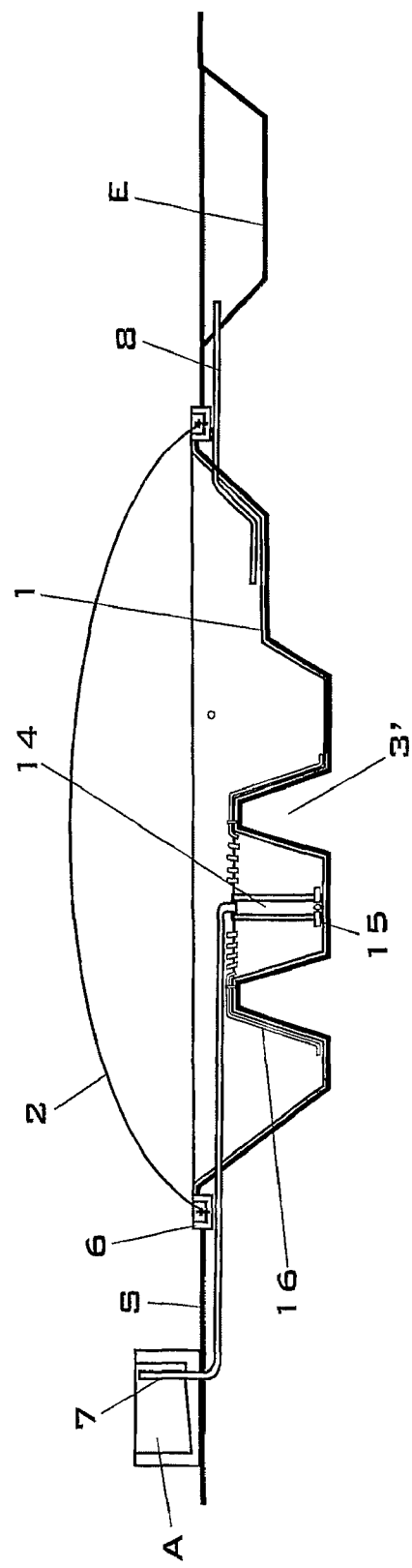
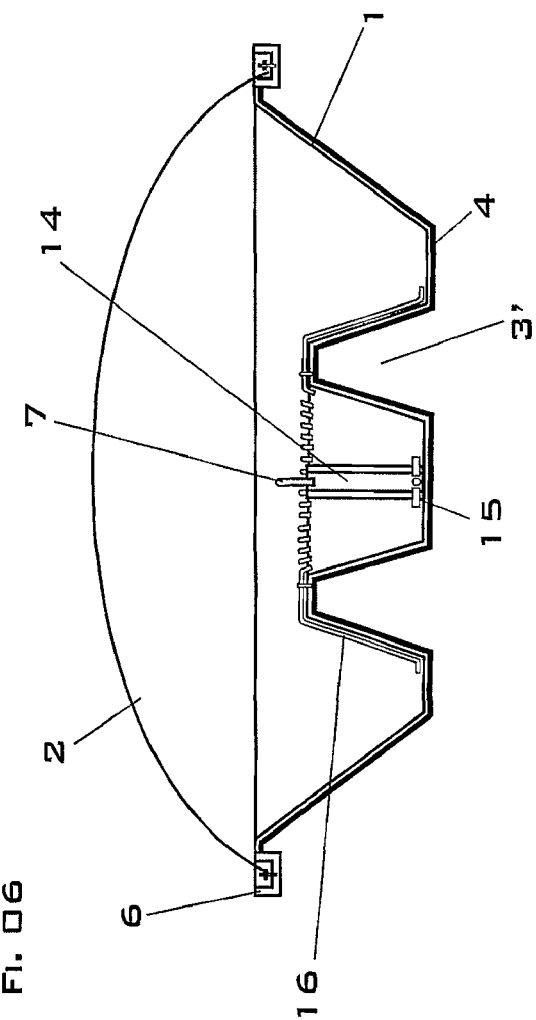

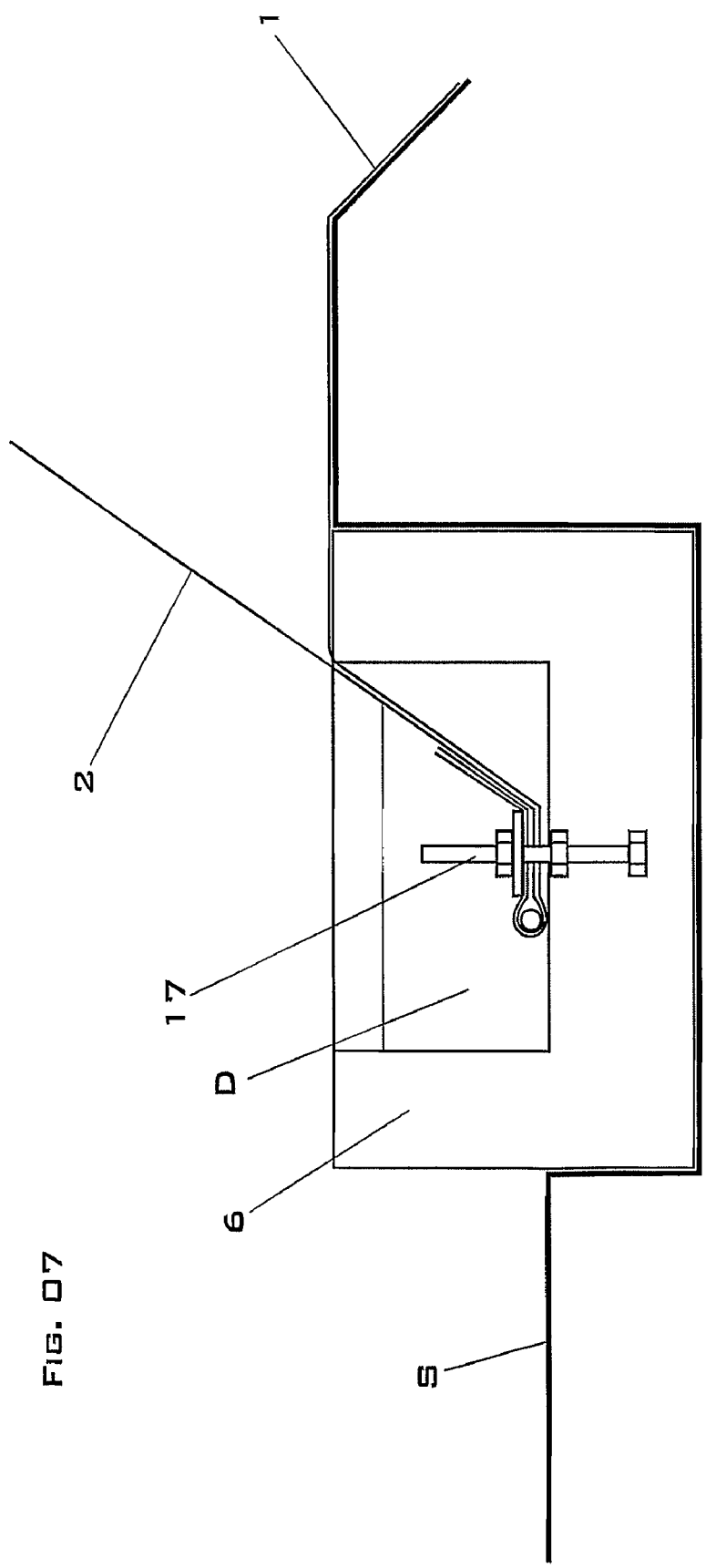

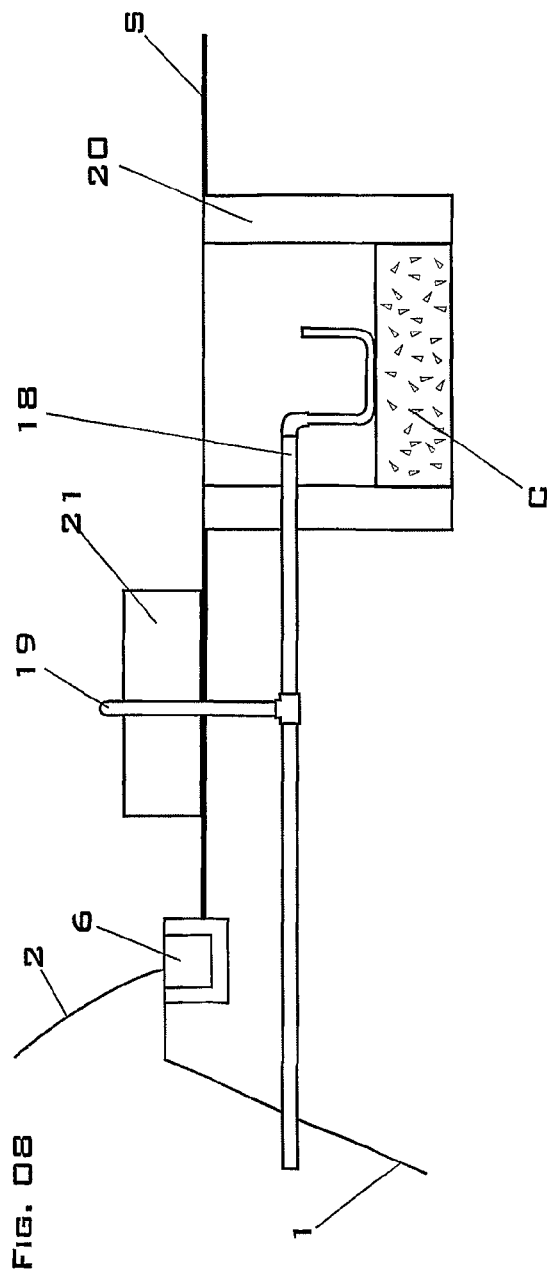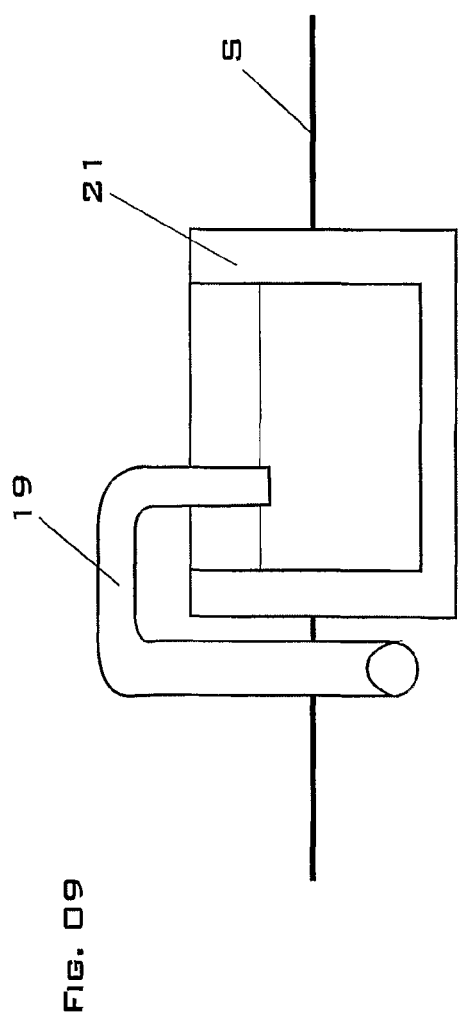

SYSTEM FOR TREATING RESIDUAL WATER

CROSS REFERENCE TO RELATED APPLICATIONS

This application is entitled to the benefit of and incorporates by reference essential subject matter disclosed in International Patent Application No. PCT/BR2005/000229 filed on Nov. 8, 2005 and Brazilian Patent Application No. MU8502055-9 filed Sep. 27, 2005.

PURPOSE OF THE INVENTION

Improvement on a system for treating residual water brings a new and less cumbersome solution for the erection of a system capable of treating industrial, agro-industrial and domestic residual water from very inexpensive components that are readily assembled on a site requiring minimal excavation.

FIELD OF THE INVENTION

The present disclosure relates to systems for treating residual water with organic matter, which is produced in the effluents of industries, agro-industries, commercial businesses and residences, enabling the capture of biogas. The system allows the stabilization of the organic matter found in the residual water, therefore reducing the organic load, providing the production and collection of biogas, which is a fuel gas and can be used for several purposes. As it is an anaerobic environment, the system is close, isolating the residual water from human and animal contact, presenting efficiency to reduce organic load, diminishing odors and the incidence of flies, avoiding the emission of methane to the atmosphere, reducing the number of fecal residues and enabling economic added value through the appropriate use of biogas. In short, the system can be used to improve the environmental quality, with the possibility of adding economic value besides the environmental gain.

BACKGROUND OF THE INVENTION

The generation of residual water in industrial and agro-industrial processes as well as in commercial businesses and residences is something worrisome when the issue is analyzed through the environmental aspects involved.

Residual water essentially consists of the community supply water, after having served a variety of uses and may be defined as a combination of liquids or water transporting residues removed from residences, commercial and industrial businesses, several institutions and, in the rural environment, animal facilities, agro-industries, etc.

If the residual water is accumulated, the decomposition of organic material may lead to the production of big quantities of smelly gases. In addition to this, untreated residual water usually contains numerous pathogenic microorganisms which inhabit the human or animal intestinal tract, or which may be present in certain industrial residues. Residual water also contains nutrients that can stimulate the growth of aquatic plants but they can also contain toxic components. Therefore, the immediate removal of residual water from the generating sources, followed by its treatment and disposition is not only desirable but it is also necessary in a society concerned about health issues.

The spill of residual water without a previous treatment has been causing the contamination of the soil, as well as superficial and subterraneous water, being a hazard to public health and bringing different damage and discomfort to human beings and animals besides the emission of gases that affect the whole environment and the quality of life.

Biodigestors and the anaerobic ponds are facilities aiming to provide the physical storage of organic dejects in which the biochemical transformations related to the anaerobic biodigestion process of the organic fraction contained in residual water take place. The bacteria and the methanogenic Archaea are the main cause for the organic fraction degradation and, in the anaerobic processes biogas is produced, which consists mainly of methane. The anaerobic systems cater for a number of residues with organic characteristics found both in the urban and rural environments, making them an important option for the treatment and stabilization of organic matter and for generating biogas.

This gas can be used in direct combustion or as fuel for alternative motors, to generate electrical power or for several kinds of equipment used in water and gas heating and cooling.

Several types of systems for the suitable treatment of residual water have been created. However, due to the volumes generated, the high costs make it difficult for the systems to be applied on a large scale.

SUMMARY OF THE INVENTION

Hence, the objectives of the present model are very clear, that is to say, to present an anaerobic digestion system, coupling a biodigestor with an anaerobic pond in a single body, the construction of which should be simplified in relation to the biodigestors for residual water and ponds conventionally used, as well as providing a treatment system that may be more accessible, enabling its application on any scale and for any volume of residual water and with the possible use of the energetic potential contained in this water.

Within this scope, the present coupled anaerobic system has as its main characteristic the use of a biodigestor inserted in a pond, made of simple parts, with an easy execution, involving a few elements of stonemasonry, presenting the flexible PVC blankets as its main constructive material, making its construction simpler and quicker, as well allowing its assembly and disassembly.

Each anaerobic coupled system has three different segments in its interior. The residual water will enter through the front part, which is deeper, in a central compartment, (reactor), which will contain the mud and will allow an ascending flow. The central compartment has its volume dimensioned according to the desired time of hydraulic retention, which should be compatible with the organic load of the water to be treated in the system. When coming out of the central compartment in a descending movement through rigid PVC tubes, the water will reach the bottom of the front part of the compartment still deep so that the mud dragged from the central part can be decanted. When leaving the frontal compartments, more deeply, the water will flow horizontally in the rear compartment, which is used for stabilization, allowing the outflow from the system in the right conditions for the final disposition of the water in the soil or to complement the treatment, depending on the regulations.

The proposed system's main elements are biodigestors which are simple to build, some elements of stonemasonry, inlet box and gutters, tubes of rigid plastic and reservoir made of flexible PVC for the reception and storage of the biofertilizer. Therefore, the basic conformation consists of basic flexible PVC blankets, with three fermentation chambers (reactor, 30 deeper pond and anaerobic pond) and the gas meter, the blankets being suitably anchored in the gutters to form the biodigestors without the use of expensive structural elements.

Therefore, the present model has the advantage of a simple construction, as it can be built in any place, with a simplified installation procedure that does not require specialized workers, can be disassembled, besides having a low cost when compared to the existing models, contributing to the conservation of the environment and protecting both human and animal health.

The biodigestors will basically consist of two pyramid trunks excavated in the soil, but to meet the requested needs, according to the availability of constructive materials, two variables may be adopted to build the reactor in the front part. In the first possibility, the construction of the reactor can be made of materials such as steel, stonemasonry, solid bricks and blocks, pre-molded concrete tubes and rigid PVC. In the second variable, the reactor located in the front part, will be molded in the soil during the excavation, and in both cases, a finishing with flexible PVC blankets will be made.

BRIEF DESCRIPTION OF THE DRAWINGS

Hence, to better clarify the patent proposed above, a detailed description of such model will be presented below, with illustrations in the attached drawing sheets in which:

FIG. 2 shows a lateral view according to section A-A of the previous drawing, detailing the disposition of the three fermentation chambers;

FIG. 3 shows another lateral view, illustrating the biodigestor according to section B-B, illustrated in drawing 1;

FIG. 5 shows a lateral view, according to cut C-C of the previous drawing, detailing the disposition of the three fermentation chambers;

FIG. 6 shows another lateral view, illustrating the biodigestor, according to cut D-D illustrated in drawing 4;

FIG. 7 shows the detailing of the upper and lower PVC blanket anchorage system in the gutters;

FIG. 8 shows the detailing of the biogas network outlet, and the;

FIG. 9 shows a view like the previous one, illustrating the safety valve in the biogas network.

DETAILED DESCRIPTION OF THE INVENTION

Figure 1:
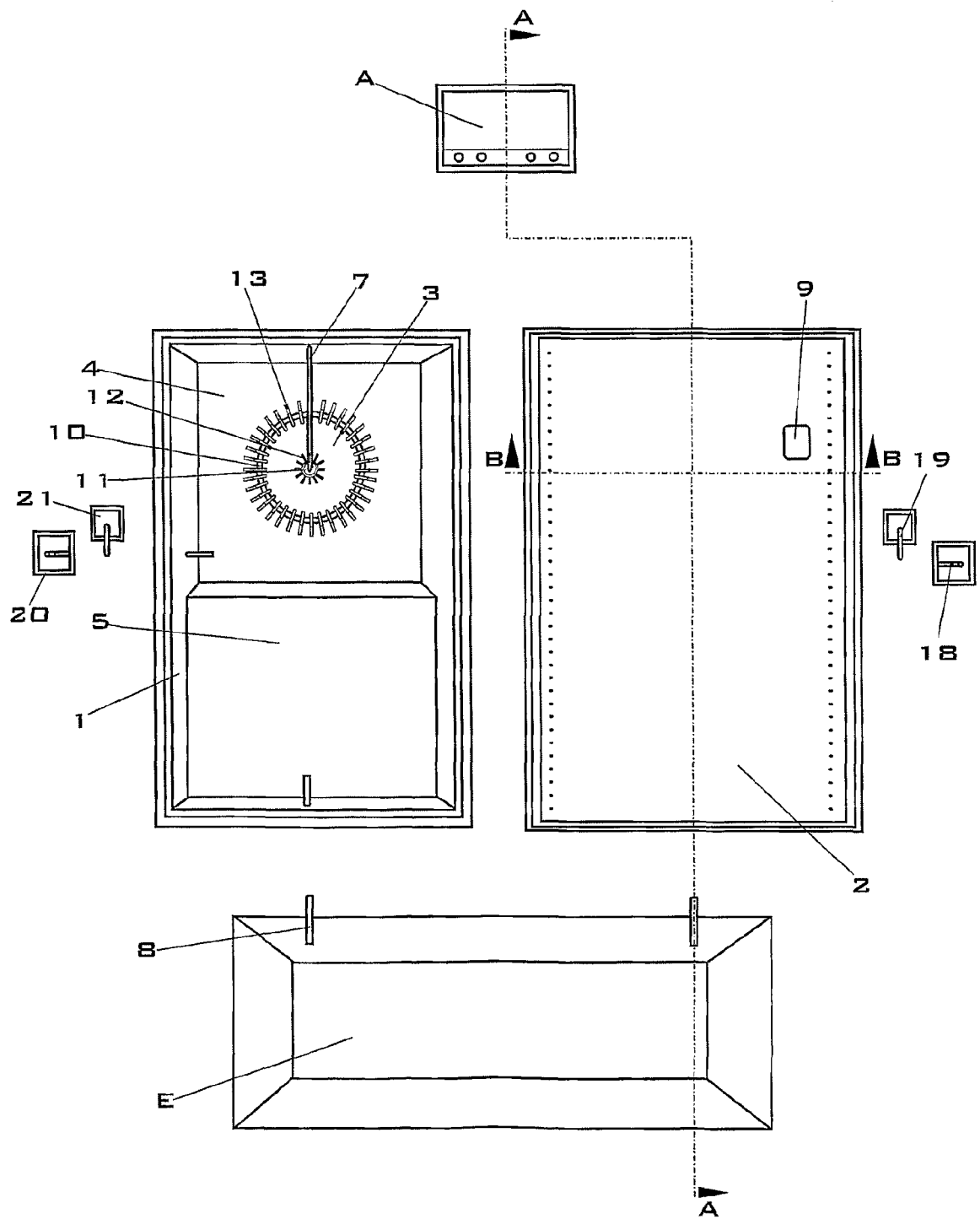
FIG. 1 shows a low plan illustrating the system (one of the biodigestors without the cover), detailing the disposition of the three fermentation chambers: reactor built with several materials, deep chamber and anaerobic pond.
Figure 4:
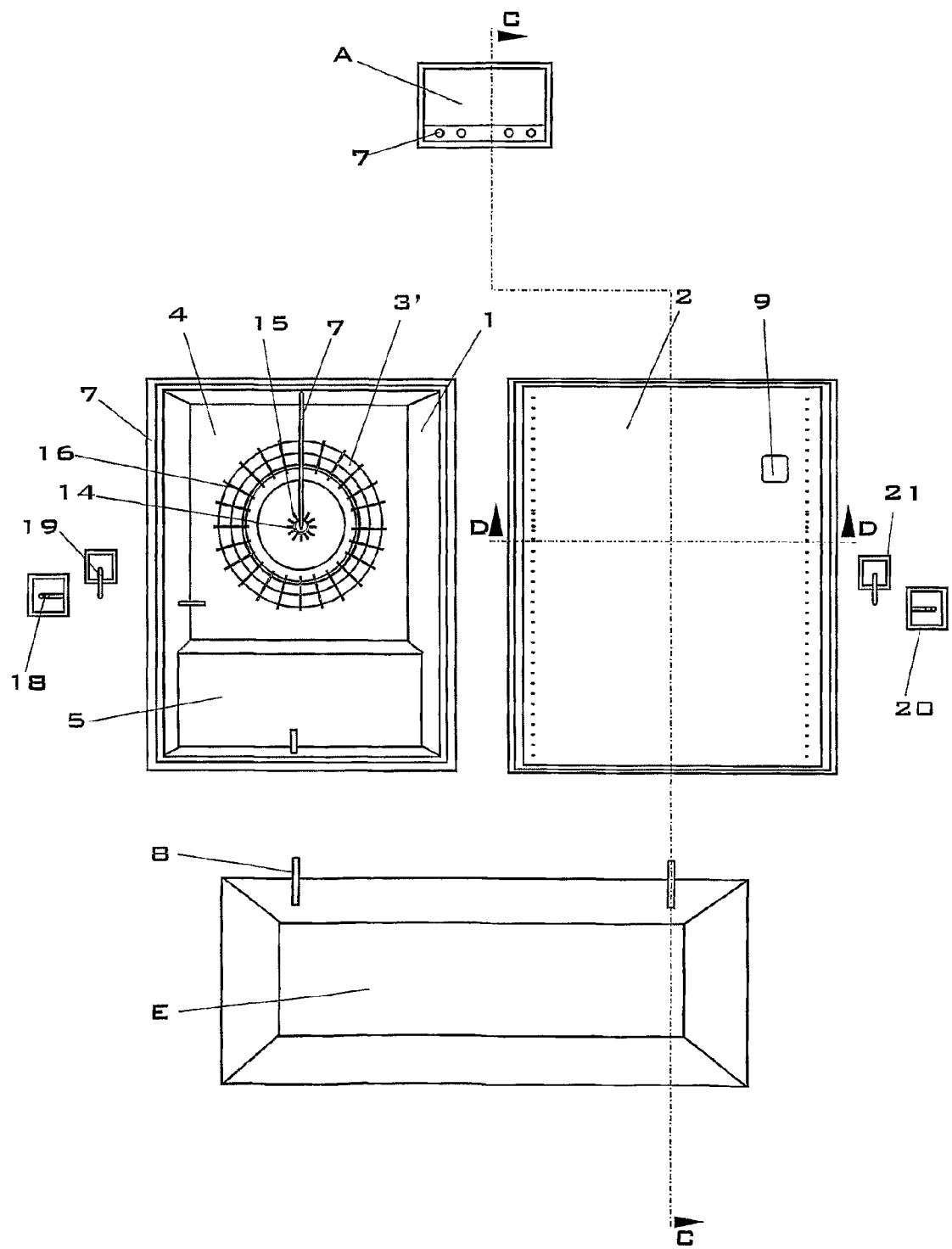
FIG. 4 shows a low plan of the system (one of the biodigestors without the cover) detailing the disposition of the three fermentation chambers with the reactor molded in the soil.

Thus, the improvement on a system for treating residual water is basically conformed by a lower blanket (1), preferably produced with PVC, and by a cover blanket (2), which is also preferably produced with PVC of any color, which can also be double-faced.

The present model also features a reactor (3), a deep chamber (4) and an anaerobic pond (5), and such elements may be excavated in the soil (S) or can be built in stonemasonry or with other type of suitable material for this purpose.

The referred to blanket (1) is applied to cover a hole excavated in the soil with variable dimensions, according to the project, and shutters are built alongside this hole (6), which will be used to anchor the lower (1) and upper blankets (2), also used to provide sealing to the fermenting substratum and the biogas.

In the lower blanket (1), applied on the walls of such hole, at least four openings are foreseen, one in the frontal upper part for the inlet tube (7) of the affluent (A), another opening in the rear part for the outlet tube (8) of the treated effluent (E) and a third opening (9), alongside the biodigestor, for handling the fermenting substratum and a fourth opening for the passage of the tubes which are used to remove the excess of mud generated in the reactor (3).

The reactor (3) may consist of an element made of stonemasonry (10), equipped with a central tube (11), in the upper portion of which is located the inlet tube (7). In the lower part of such tubing (11) passage tubes are foreseen (12) arranged in radial manner, while close to such stonemasonry element (10) other conducting tubes are foreseen (13) which lead the residual water out of the reactor (3) to the lower portion of the deep chamber (4).

In a different embodiment of such reactor (3), a slope reactor can be foreseen (3'), made in the soil (S), and in its center a tubing is foreseen (14), in the upper portion of which there is the inlet tube (7). In the lower portion of such tubing (14) passage tubes are foreseen (15) and in the upper portion of such slope (3') conducting tubes are also foreseen (16) which lead the residual water to the lower portion of the deep chamber (4).

The lower blanket (1) and the cover (2), are dully attached by means of steel or wooden bars and screws (17), which are welded to such gutters (6), defining a water layer (D) which allows the isolation and sealing, of both the fermenting substratum and the biogas.

In such cover (2), at least two openings are foreseen; the first one for the installation of an outlet valve (18) for the biogas and the other is a passage for the biogas safety valve (19). Such outlet valve (18) consists of a box (20), in which a pebble bottom is deposited (C), while the outlet is conformed by the tubing itself. The safety valve (19) consists of a box (21), in which a certain water volume is foreseen and the tubing is immerse in the liquid.

The cover (2) configures the gas meter, which becomes inflated with the biogas formation and is used to store such gas.

Therefore, as it has been described, it can be noted that the improvement on a system for treating residual water, can be characterized as a patent as it presented the conformation of a system that is practical, efficient and cheaper than the existing ones, combining and modifying familiar elements in a new arrangement of improved details besides being perfectly feasible for the application in the treatment of residual water generated in several sectors of industry, agro-industry, commerce and residences.

What is claimed is:

1. A system for treating residual water characterized by being conformed through excavation in the land, presenting three segments, equipped with an anaerobic reactor, made with conventional construction materials or molded in a slope in the soil, such reactor consisting of a stonemasonry element, in the central portion of which is foreseen a tubing, and in the lower portion of which the inlet tubing is pointed and in the lower portion passage tubes are foreseen and next to the stonemasonry element conducting tubes are foreseen; such reactor may be built in a slope, molded in the soil, such reactor being equipped with a tubing, in the upper portion of which the inlet tubing is pointed and in its lower portion passage tubes are foreseen, while next to the slope conducting tubes are foreseen, such reactor being set up in the deep chamber, which presents an anaerobic pond at a higher plan, all the three segments in a single body covered by a blanket and protected by a cover blanket; laterally, gutters are built, which are used to anchor the lower and upper blankets providing the sealing, by means of steel or wood bars and screws, welded in such gutters, defining a water layer providing isolation and sealing; while in the lower blanket, at least four openings are foreseen, one in the frontal upper part for the inlet tubing passage of the affluent, a second tubing in the frontal part for the treated effluent outlet, a third lateral opening, and a fourth opening for the passage of the tubes which are used to remove the excess of mud generated in the reactor, whereas in such cover, which configures the biogas reservoir, at least two openings are foreseen, the first one for the installation of an outlet valve for the biogas and the second one is a passage for a safety valve.

2. The system according to claim 1, wherein the fact that on such cover different openings and passages may be conformed as well in the land cover blanket.

3. A water treatment system comprising:
- an anaerobic chamber formed from polymeric sheet, and adapted to receive water to be treated, and from which chamber treated water is discharged;
- a lower polymeric sheet provided as a blanket in an excavation shaped to define a reactor depression in a lower part of said chamber;
- a bio-digestive reactor in said depression for treating the fermentables in the water and generating bio-gasses;
- a cover sheet, also polymeric, and said sheets having overlapping peripheries, and sealing means for clamping said overlapping peripheries to trap pressure from these gasses, said sealing means comprising a trough surrounding said chamber and adapted to contain water of sufficient depth to cover said over lapped peripheries of said polymeric sheets;
- inlet and outlet tubing for the intake of water to be treated and for the exit of treated water.

4. The water treatment system of claim 3, further including means for tapping these pressurized bio-gasses for fuel or other purpose.

5. The water treatment system of claim 3, wherein said polymeric sheet comprises polyvinyl chloride (PVC).

6. The water treatment system of claim 3, wherein said water filled trough also serves to anchor said peripheral sheet edges and restrain said cover sheet from moving due to the pressure exerted thereon by said bio-gasses.

7. The water treatment system of claim 3, further including at least one additional depression defined in said chamber lower part alongside said reactor depression.

* * * * *